United States Patent
Park

(10) Patent No.: US 8,493,135 B2
(45) Date of Patent: Jul. 23, 2013

(54) SEMICONDUCTOR INTEGRATED CIRCUIT

(75) Inventor: Jae-Boum Park, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 162 days.

(21) Appl. No.: 13/100,991

(22) Filed: May 4, 2011

(65) Prior Publication Data

US 2012/0194232 A1 Aug. 2, 2012

(30) Foreign Application Priority Data

Jan. 27, 2011 (KR) .................. 10-2011-0008216

(51) Int. Cl.
*G05F 1/10* (2006.01)

(52) U.S. Cl.
USPC ........................................... 327/536

(58) Field of Classification Search
USPC ............................. 327/535, 536, 537
See application file for complete search history.

(56) References Cited

U.S. PATENT DOCUMENTS

| | | | |
|---|---|---|---|
| 6,137,343 A | 10/2000 | Matano | |
| 6,522,191 B1 * | 2/2003 | Cha et al. | 327/536 |
| 6,597,235 B2 | 7/2003 | Choi | |
| 7,173,478 B2 | 2/2007 | Chun | |
| 7,282,986 B2 * | 10/2007 | Kang et al. | 327/536 |
| 7,310,014 B2 | 12/2007 | Lee et al. | |
| 7,449,944 B2 | 11/2008 | Byeon et al. | |
| 7,656,222 B2 * | 2/2010 | Kwon | 327/536 |
| 7,982,530 B2 * | 7/2011 | Byeon | 327/536 |

FOREIGN PATENT DOCUMENTS

| | | |
|---|---|---|
| KR | 1020000059511 | 10/2000 |
| KR | 1020020007439 | 1/2002 |
| KR | 1020060113266 | 11/2006 |
| KR | 1020090093307 | 9/2009 |
| KR | 1020100088955 | 8/2010 |

OTHER PUBLICATIONS

Office Action issued by the U.S. Patent & Trademark Office on Dec. 30, 2009 for U.S. Appl. No. 12/130,623.
Office Action issued by the U.S. Patent & Trademark Office on Aug. 26, 2010 for U.S. Appl. No. 12/847,451.
Office Action issued by the Korean Intellectual Property Office on Jul. 21, 2009 for Korean Patent Application No. 10-2008-0018762.
Notice of Allowance issued by the Korean Intellectual Property Office on Dec. 14, 2012.

* cited by examiner

*Primary Examiner* — Jeffrey Zweizig
(74) *Attorney, Agent, or Firm* — IP & T Group LLP

(57) ABSTRACT

A semiconductor integrated circuit includes a pre-charge signal generator configured to pre-charge a plurality of oscillation signals to a certain voltage level in a pre-charge mode, wherein the pre-charge signal generator includes: a first storage unit for storing a first pre-charge oscillation signal in response to a reference oscillation signal, a feedback unit for feeding back a second pre-charge oscillation signal, a second storage unit for storing the second pre-charge oscillation signal corresponding to an output signal of the first storage unit in response to the reference oscillation signal, and a pre-charge signal output unit for outputting a pre-charge signal in response to the first pre-charge oscillation signal and the second pre-charge oscillation signal.

24 Claims, 7 Drawing Sheets

SEMICONDUCTOR INTEGRATED CIRCUIT

CROSS-REFERENCE TO RELATED APPLICATIONS

The present application claims priority of Korean Patent Application No. 10-2011-0008216, filed on Jan. 27, 2011, which is incorporated herein by reference in its entirety.

BACKGROUND

1. Field of the Invention

Exemplary embodiments of the present invention relate to a semiconductor design, and more particularly, to an internal voltage generation circuit of a semiconductor device.

2. Description of the Related Art

In general, semiconductor memory devices, including Double Data Rate Synchronous Dynamic Random Access Memory (DDR SDRAM) devices, include an internal voltage generation circuit for efficient power consumption and internally generate and use internal voltages with various voltage levels. Internal voltages include a core voltage, having a voltage level between an external power source voltage and a ground power source voltage, and a peripheral voltage. Additionally, there is a pumping voltage, having a higher voltage level than the external power source voltage, and a substrate bias voltage, having a lower voltage level than the ground power source voltage. The pumping voltage is conventionally generated from a charge pumping operation.

FIG. 1 is a block diagram illustrating a first pumping voltage generation circuit according to prior art.

Referring to FIG. 1, the first pumping voltage generation circuit 100 includes a voltage level detector 110, a reference oscillation signal generator 120, an oscillation signal generator 130, and a pumping voltage generator 140. The voltage level detector 110 receives a reference voltage VREF and detects a pumping voltage VPP. The reference oscillation signal generator 120 generates a reference oscillation signal OSCP_PRE in response to a detection signal VPPOSCEN outputted from the voltage level detector 110. The oscillation signal generator 130 sequentially generates a plurality of oscillation signals OSC1 to OSC6 in response to the reference oscillation signal OSCP_PRE. The pumping voltage generator 140 generates the pumping voltage VPP in response to the oscillation signals OSC1 to OSC6.

Herein, the voltage level detector 110 is an element for detecting the pumping voltage VPP consistently based on the reference voltage VREF, and the voltage level detector 110 also monitors whether the voltage level of the pumping voltage VPP is higher or lower than the reference voltage VREF continuously.

The reference oscillation signal generator 120 performs an oscillation operation when the voltage level of the pumping voltage VPP is lower than the reference voltage VREF. For example, when the voltage level of the pumping voltage VPP is lower than the reference voltage VREF, the detection signal VPPOSCEN may be enabled thereby triggering the reference oscillation signal generator to perform an oscillation operation. In performing an oscillation operation, the reference oscillation signal generator 120 generates the reference oscillation signal OSCP_PRE having a predetermined frequency. Meanwhile, the reference oscillation signal generator 120 generates an initialization signal OSCP_RST in response to the detection signal VPPOSCEN and applies the initialization signal OSCP_RST to the oscillation signal generator 130.

Next, the oscillation signal generator 130 generates the oscillation signals OSC1 to OSC6, having a predetermined phase difference from each other, by dividing and shifting the frequency of the reference oscillation signal OSCP_PRE. Herein, the oscillation signals OSC1 to OSC6 are sequentially oscillated due to the predetermined phase difference. Further, the oscillation signal generator 130 is initialized in response to the initialization signal OSCP_RST.

Also, the pumping voltage generator 140, although not illustrated in the drawing in detail, includes a plurality of pumping voltage units. Each of the pumping voltage units receives one corresponding oscillation signal from among the oscillation signals OSC1 to OSC6 and sequentially performs a charge pumping operation.

Hereafter, the operation of the first pumping voltage generation circuit 100 having the above-described structure is described.

In this specification, for the sake of convenience in description, a case where the voltage level of the pumping voltage VPP is lower than the voltage level of the reference voltage VREF is referred to as an active mode, while a case where the voltage level of the pumping voltage VPP is higher than the voltage level of the reference voltage VREF is referred to as a pre-charge mode.

First, the active mode is described,

The voltage level detector 110 enables the detection signal VPPOSCEN when the voltage level of the pumping voltage VPP is lower than the reference voltage VREF. For example, the voltage level detector 110 outputs a detection signal VPPOSCEN of a logic high level.

The reference oscillation signal generator 120 then performs an oscillation operation in response to the detection signal VPPOSCEN and enables the reference oscillation signal OSCP_PRE. The oscillation signal generator 130 sequentially enables the oscillation signals OSC1 to OSC6 in response to the reference oscillation signal OSCP_PRE. In other words, the oscillation signal generator 130 outputs the oscillation signals OSC1 to OSC6 having the predetermined phase difference by dividing and shifting the frequency of the reference oscillation signal OSCP_PRE.

Accordingly, the pumping voltage generator 140 sequentially performs a charge-pumping operation in response to the oscillation signals OSC1 to OSC6 that are sequentially enabled so as to generate the pumping voltage VPP.

Second, the pre-charge mode is described.

When the voltage level of the pumping voltage VPP becomes higher than the reference voltage VREF, the voltage level detector 110 disables the detection signal VPPOSCEN. For example, the voltage level detector 110 outputs a detection signal VPPOSCEN of a logic low level.

Accordingly, the reference oscillation signal generator 120 and the oscillation signal generator 130 stop the oscillation operation, thereby causing the pumping voltage generator 140 to stop the charge pumping operation.

The first pumping voltage generation circuit 100 described above may minimize noise caused in the pumping voltage VPP by sequentially performing the charge pumping operation.

The first pumping voltage generation circuit 100, however, has the following drawbacks.

FIG. 2 is a timing diagram of the oscillation signals OSC1 to OSC6 for describing disadvantages of the first pumping voltage generation circuit 100. FIG. 2 illustrates an exemplary scenario in which the first pumping voltage generation circuit 100 enters an active mode ACT, subsequently switches to a pre-charge mode PCG, and then switches back to the active mode ACT.

Referring to FIG. 2, the oscillation signals OSC1 to OSC6 are toggled in the active mode and pre-charged to a certain voltage level (e.g., a predetermined voltage level) in the pre-charge mode. Herein, when the oscillation signals OSC1 to OSC6 are pre-charged to a logic high level, the oscillation signals OSC1 to OSC6 remain at the logic high level for one cycle 1tCK after the mode is switched into the active mode, which is problematic. This is because the oscillation signal generator 130 includes a frequency dividing unit (not shown). To be specific, the frequency dividing unit typically includes a T-flipflop, and the T-flipflop characteristically causes a delay of one cycle 1tCK.

To overcome the above problems, a second pumping voltage generation circuit, which controls the oscillation signals OSC1 to OSC6 to be pre-charged when the oscillation signals OSC1 to OSC6 are in a logic low level in the pre-charge mode, may be implemented.

FIG. 3 is a block diagram illustrating a second pumping voltage generation circuit according to additional prior art, and FIG. 4 is an internal circuit diagram illustrating a reference oscillation signal generator and an oscillation signal generator that are shown in FIG. 3.

Herein, for the sake of convenience in description, the same signal symbols and element names as those appearing in the first pumping voltage generation circuit 100 of FIG. 1 are used to describe the second pumping voltage generation circuit.

Herein, those structures of the second pumping voltage generation circuit which differ from those of the first pumping voltage generation circuit 100 shown in FIG. 1 are described.

Referring to FIG. 3, an oscillation signal generator 230 of the second pumping voltage generation circuit 200 applies a pre-charge signal OSCP_PCGENB, which is enabled in the pre-charge mode, to a reference oscillation signal generator 220. This is described in detail with reference to FIG. 4.

Referring to FIG. 4, the reference oscillation signal generator 220 generates a reference oscillation signal in response to a pre-charge signal OSCP_PCGENB and a detection signal VPPOSCEN. The oscillation signal generator 230 sequentially generates a plurality of oscillation signals OSC1 to OSC6 in response to a reference oscillation signal OSCP_PRE.

The oscillation signal generator 230 includes a frequency dividing/shifting unit 232, a sequential oscillation signal generation unit 234, and a pre-charge signal generation unit 236. The frequency dividing/shifting unit 232 generates first and second source oscillation signals OSC_ODD and OSC_EVEN in response to the reference oscillation signal OSCP_PRE. The sequential oscillation signal generation unit 234 sequentially generates the oscillation signals OSC1 to OSC6 in response to the first and second source oscillation signals OSC_ODD and OSC_EVEN. The pre-charge signal generation unit 236 generates the pre-charge signal OSCP_PCGENB in response to the first and second source oscillation signal OSC_ODD and OSC_EVEN.

The frequency dividing/shifting unit 232 generates the first source oscillation signal OSC_ODD by dividing the reference oscillation signal OSCP_PRE, and generates the second source oscillation signal OSC_EVEN by shifting the source oscillation signal OSC_ODD by a predetermined time.

The pre-charge signal generation unit 236 generates the oscillation signals OSC1 to OSC6 that are sequentially enabled in response to the first and second source oscillation signals OSC_ODD and OSC_EVEN.

The pre-charge signal generation unit 236 enables the pre-charge signal OSCP_PCGENB when the first and second source oscillation signals OSC_ODD and OSC_EVEN are both at a predetermined voltage level. For example, the pre-charge signal generation unit 236 outputs a pre-charge signal OSCP_PCGENB of a logic low level when the first and second source oscillation signals OSC_ODD and OSC_EVEN are both at a logic low level.

Hereafter, the operation of the second pumping voltage generation circuit 200 having the above-described structure is described with reference to FIG. 5. Herein, for the sake of convenience in description, the operations of the reference oscillation signal generator 220 and the oscillation signal generator 230 are described, and they are described in the order of an active mode ACT switched to a pre-charge mode PCG and then from the pre-charge mode PCG back to the active mode ACT.

FIG. 5 is a timing diagram of the oscillation signals OSC1 to OSC6.

Referring to FIG. 5, once the second pumping voltage generation circuit 200 enters the active mode ACT, the reference oscillation signal generator 220 toggles the reference oscillation signal OSCP_PRE in response to an enabled detection signal VPPOSCEN, and the oscillation signal generator 230 sequentially toggles the oscillation signals OSC1 to OSC6 in response to the toggling reference oscillation signal OSCP_PRE.

In this state, when the second pumping voltage generation circuit 200 is switched into the pre-charge mode PCG, the pre-charge signal generation unit 236 enables/outputs a pre-charge signal OSCP_PCGENB of a logic low level when the first and second source oscillation signals OSC_ODD and OSC_EVEN are both at a logic low level.

Then, the reference oscillation signal generator 220 generates the reference oscillation signal OSCP_PRE in response to the enabled pre-charge signal OSCP_PCGENB, and the oscillation signal generator 230 receives the generated reference oscillation signal OSCP_PRE and fixes and outputs the received reference oscillation signal OSCP_PRE when the oscillation signals OSC1 to OSC6 are at a logic low level. In short, when the pre-charge signal OSCP_PCGENB is enabled, the oscillation signals OSC1 to OSC6 are pre-charged when they are at a logic low level.

Subsequently, when the mode is switched back to the active mode ACT, as described earlier, a series of operations corresponding to the active mode ACT are performed, sequentially toggling the oscillation signals OSC1 to OSC6.

The second pumping voltage generation circuit 200 has an advantage of toggling the oscillation signals OSC1 to OSC6 without a delay in the next active mode by pre-charging the oscillation signals OSC1 to OSC6 to a predetermined voltage level in the pre-charge mode PCG.

The second pumping voltage generation circuit 200, however, has the following drawbacks.

FIGS. 6 and 7 illustrate concerns associated with the second pumping voltage generation circuit 200.

Referring to FIG. 6, the reference oscillation signal generator 220 and the oscillation signal generator 230 are disposed away from each other to decrease the signal line of the second pumping voltage generation circuit 200. In other words, three signal lines for transferring the reference oscillation signal OSCP_PRE, the initialization signal OSCP_RST, and the pre-charge signal OSCP_PCGENB, respectively, are disposed between the reference oscillation signal generator 220 and the oscillation signal generator 230. Since six signal lines for transferring the oscillation signals OSC1 to OSC6 are disposed between the oscillation signal generator 230 and a pumping voltage generator 240, disposing the oscillation signal generator 230 closer to the pumping voltage generator 240 than the reference oscillation signal generator 220 may decrease the total length of the signal lines if the positions of the reference oscillation signal generator 220 and the pumping voltage generator 240 are fixed.

On the other hand, when the constituent elements are disposed as described above, the signal line of the pre-charge signal OSCP_PCGENB becomes long, and thus, the time for transferring the enabled pre-charge signal OSCP_PCGENB from the oscillation signal generator 230 to the reference oscillation signal generator 220 is delayed as much as the length of the signal line of the pre-charge signal OSCP_PCGENB. Herein, if the delay time exceeds the half cycle of the reference oscillation signal OSCP_PRE, as illustrated in FIG. 7, the oscillation signals OSC1 to OSC6 may toggle in the pre-charge mode. For example, when the enabled pre-charge signal OSCP_PCGENB is not applied to the reference oscillation signal generator 220 within the half cycle of the reference oscillation signal OSCP_PRE, the logic level of the reference oscillation signal OSCP_PRE becomes logic high, which is unintentional, and thus, both the first and second source oscillation signals OSC_ODD and OSC_EVEN may not be at the logic low level. As a result, the logic level of the pre-charge signal OSCP_PCGENB becomes logic high. Therefore, a pumping voltage generator 240 performs a charge pumping operation unexpectedly, and this decreases the operation reliability of the second pumping voltage generation circuit 200.

SUMMARY

Exemplary embodiments of the present invention are directed to a semiconductor integrated circuit that may pre-charge a plurality of oscillation signals to a certain voltage level in a pre-charge mode regardless of circuit arrangement, while sequentially enabling the oscillation signals in the next active mode without a delay.

In accordance with an exemplary embodiment of the present invention, a semiconductor integrated circuit includes a pre-charge signal generator configured to pre-charge a plurality of oscillation signals to a certain voltage level in a pre-charge mode, wherein the pre-charge signal generator includes: a first storage unit configured to store a first pre-charge oscillation signal in response to a reference oscillation signal, a feedback unit configured to feed back a second pre-charge oscillation signal, a second storage unit configured to store the second pre-charge oscillation signal corresponding to an output signal of the first storage unit in response to the reference oscillation signal, and a pre-charge signal output unit configured to output a pre-charge signal in response to the first pre-charge oscillation signal and the second pre-charge oscillation signal.

In accordance with another exemplary embodiment of the present invention, a semiconductor integrated circuit includes a reference oscillation signal generator configured to generate a reference oscillation signal in response to a pre-charge signal and an active signal, an oscillation signal generator configured to sequentially generate a plurality of oscillation signals in response to the reference oscillation signal, and a pre-charge signal generator configured to generate the pre-charge signal in response to the reference oscillation signal.

In accordance with yet another exemplary embodiment of the present invention, a semiconductor integrated circuit includes a pumping voltage generator configured to generate a pumping voltage, a voltage level detector configured to detect the pumping voltage based on a reference voltage and to output a detection signal according to the detection result, a reference oscillation signal generator configured to generate a reference oscillation signal in response to a pre-charge signal and the detection signal, an oscillation signal generator configured to sequentially generate a plurality of oscillation signals for controlling the pumping voltage generator in response to the reference oscillation signal; and a pre-charge signal generator configured to generate the pre-charge signal in response to the reference oscillation signal.

DETAILED DESCRIPTION

Figure 1:
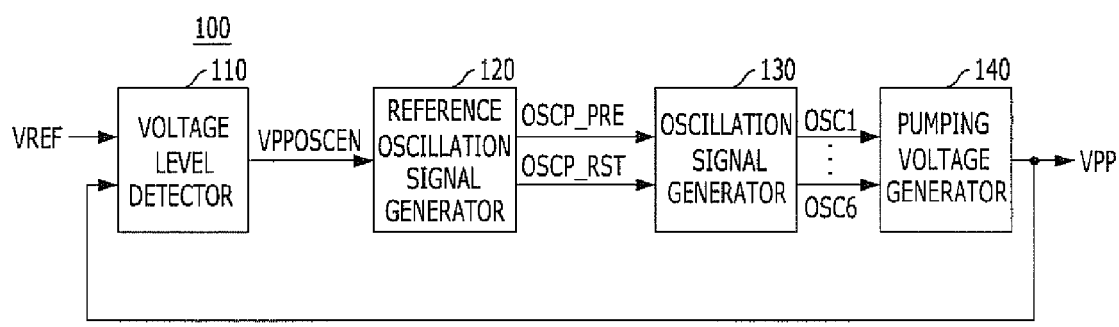
FIG. 1 is a block diagram illustrating a first pumping voltage generation circuit according to prior art.
Figure 2:
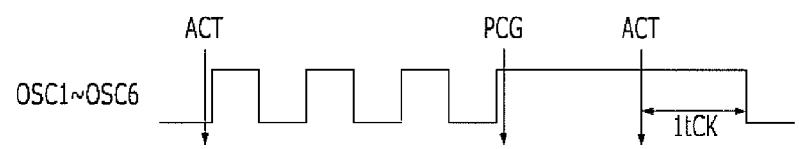
FIG. 2 is a timing diagram of oscillation signals for describing disadvantages of the first pumping voltage generation circuit shown in FIG. 1.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

A semiconductor integrated circuit in accordance with an exemplary embodiment of the present invention is described. Herein, a pumping voltage generation circuit for generating a pumping voltage is described as an example of a semiconductor integrated circuit of the present invention.

Figure 3:
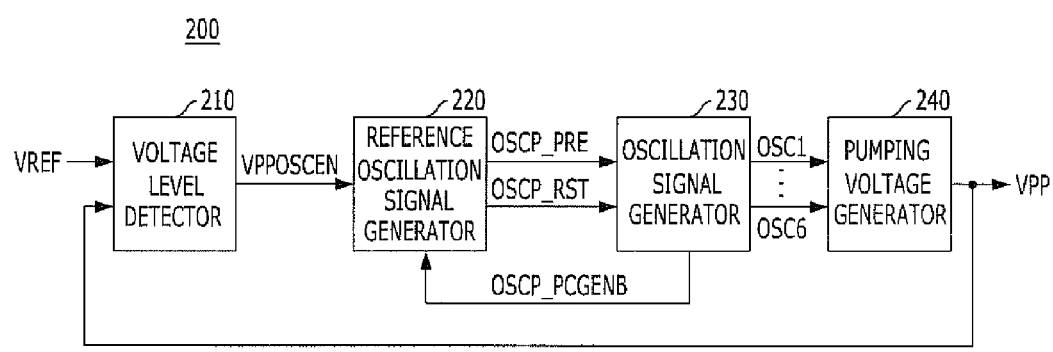
FIG. 3 is a block diagram illustrating a second pumping voltage generation circuit according to additional prior art.
Figure 4:
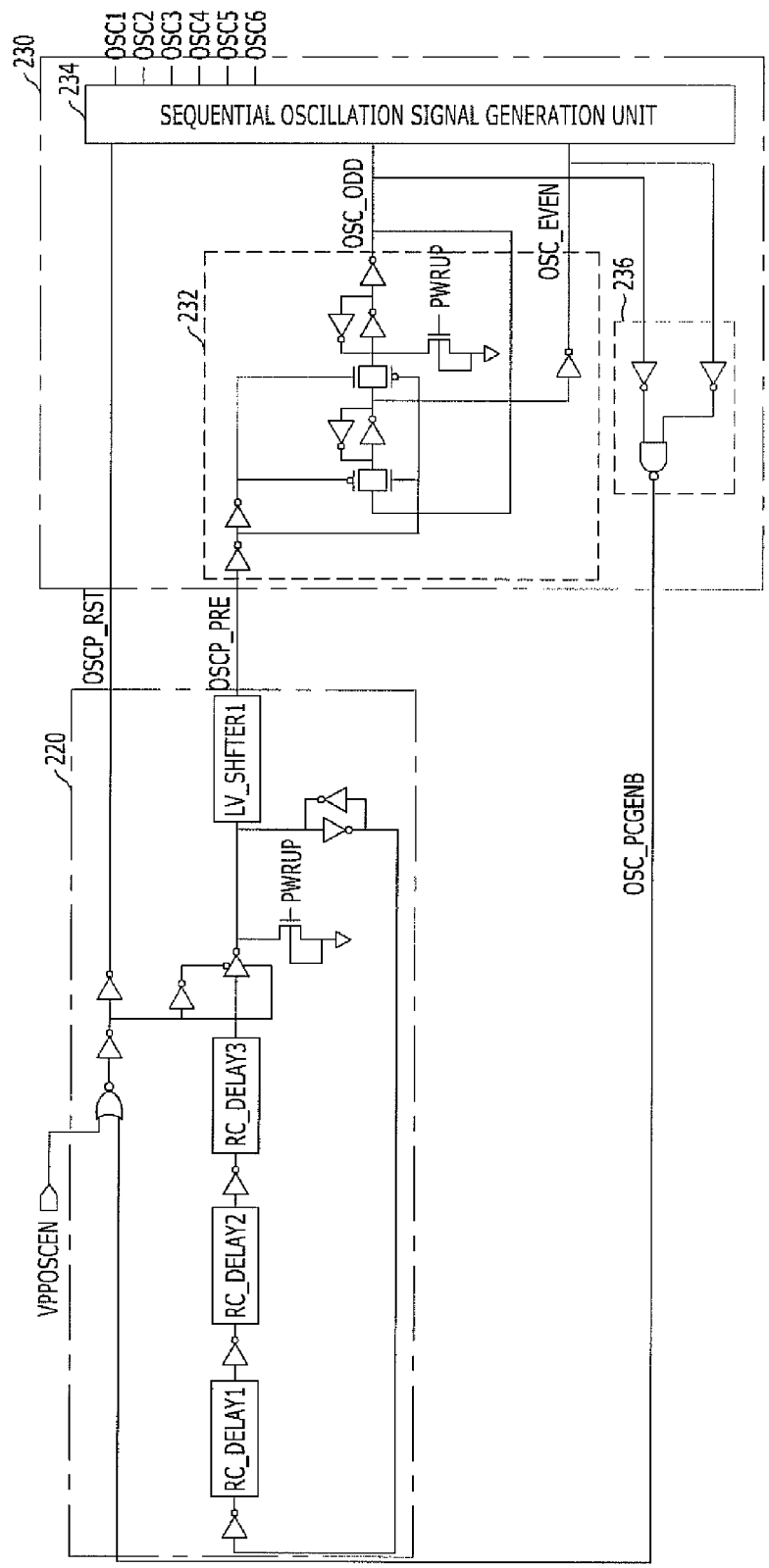
FIG. 4 is an internal circuit diagram illustrating a reference oscillation signal generator and an oscillation signal generator that are shown in FIG. 3.
Figure 5:
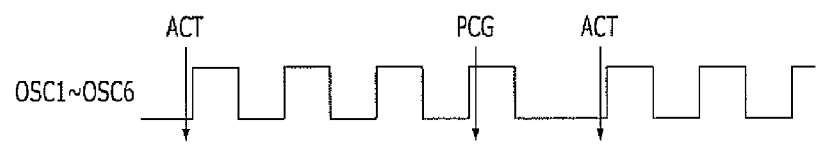
FIG. 5 is a timing diagram of a plurality of oscillation signals outputted from the oscillation signal generator of FIG. 4.
Figure 6:
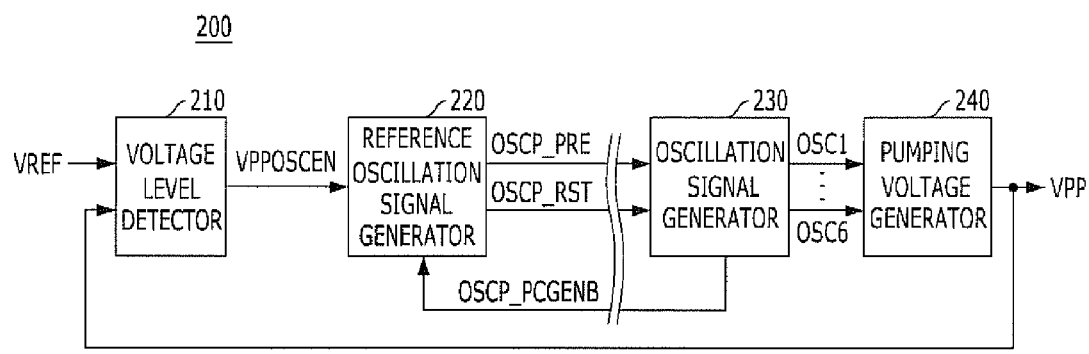
FIG. 6 is a block diagram describing concerns associated with a second pumping voltage generation circuit of FIG. 3.
Figure 7:
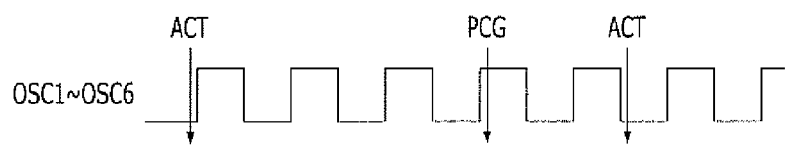
FIG. 7 is a block diagram describing concerns associated with a second pumping voltage generation circuit of FIG. 6.

For the sake of convenience in description, the same reference symbols as those of the prior art shown in FIG. 3 are given to the same constituent elements and signals of the pumping voltage generation circuit fabricated in this exemplary embodiment of the present invention.

Figure 8:
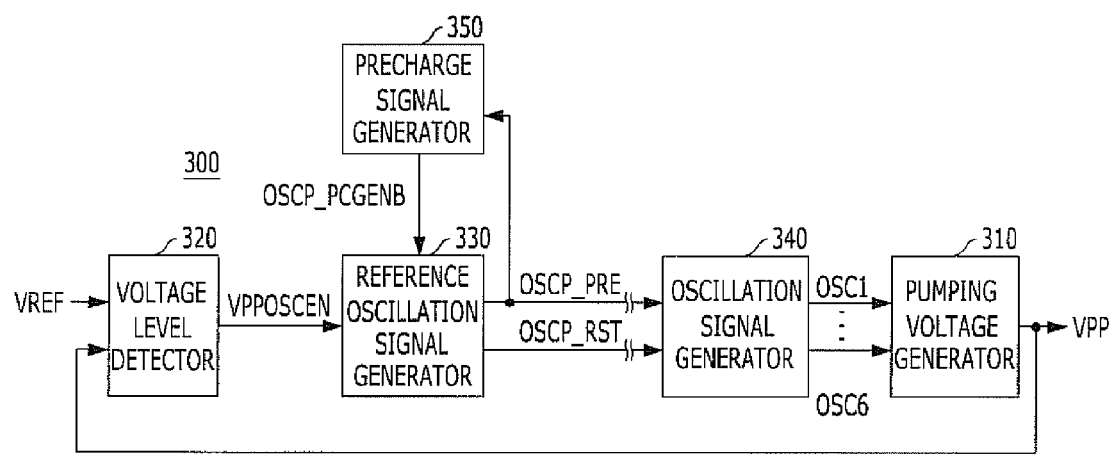
FIG. 8 is a block diagram of a pumping voltage generation circuit in accordance with an exemplary embodiment of the present invention.

FIG. 8 is a block diagram of a pumping voltage generation circuit in accordance with an exemplary embodiment of the present invention.

Referring to FIG. 8, the pumping voltage generation circuit 300 includes a pumping voltage generator 310, a voltage level detector 320, a reference oscillation signal generator 330, an oscillation signal generator 340, and a pre-charge signal generator 350. The pumping voltage generator 310 generates a pumping voltage VPP. The voltage level detector 320 detects the pumping voltage VPP based on a reference voltage VREF. The reference oscillation signal generator 330 generates a reference oscillation signal OSCP_PRE in response to a detection signal VPPOSCEN outputted from the voltage level detector 320 and a pre-charge signal OSCP_PCGENB outputted from the pre-charge signal generator 350. The oscillation signal generator 340 is disposed closer to the pumping voltage generator 310 than the reference oscillation signal generator 330 and generates a plurality of oscillation signals OSC1 to OSC6 for controlling the pumping voltage generator 310 in response to the reference oscillation signal OSCP_PRE. The pre-charge signal generator 350 is disposed closer to the reference oscillation signal generator 330 than the oscillation signal generator 340 and generates the pre-charge signal OSCP_PCGENB in response to the reference oscillation signal OSCP_PRE.

Herein, although not illustrated in the drawing, the pumping voltage generator 310 includes a plurality of reference voltage units. Each of the reference voltage units receives one corresponding oscillation signal from among the oscillation signals OSC1 to OSC6 and sequentially performs a charge pumping operation.

The voltage level detector 320 is a circuit for consistently detecting the pumping voltage VPP based on the reference voltage VREF, and it continuously monitors whether the voltage level of the pumping voltage VPP is higher or lower than the voltage level of the reference voltage VREF.

Figure 9:
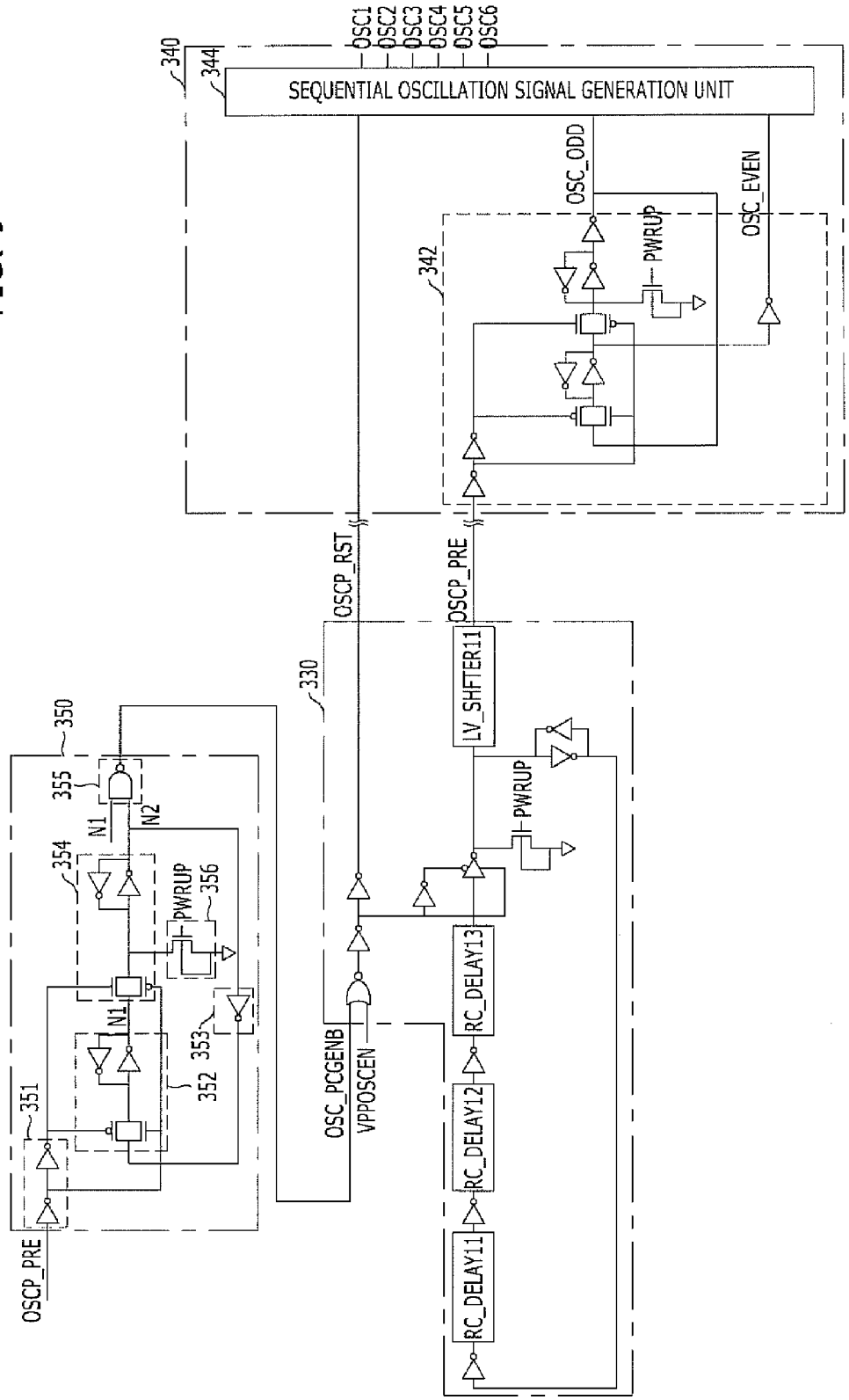
FIG. 9 is an internal circuit diagram illustrating a reference oscillation signal generator, an oscillation signal generator, and a pre-charge signal generator of FIG. 8.

Meanwhile, the reference oscillation signal generator 330, the oscillation signal generator 340, and the pre-charge signal generator 350 are described with reference to FIG. 9. FIG. 9 is an internal circuit diagram illustrating a reference oscillation signal generator 330, an oscillation signal generator 340, and a pre-charge signal generator 350 of FIG. 8.

Referring to FIG. 9, the reference oscillation signal generator 330 enables the reference oscillation signal OSCP_PRE in an active mode, which is a state where the detection signal VPPOSCEN is enabled, regardless of the pre-charge signal OSCP_PCGENB, and outputs the reference oscillation signal OSCP_PRE corresponding to the pre-charge signal OSCP_PCGENB in a pre-charge mode, which is a state in which the detection signal VPPOSCEN is disabled. The reference oscillation signal generator 330 generates an initialization signal OSCP_RST for initializing the oscillation signal generator 340 in response to the detection signal VPPOSCEN and the pre-charge signal OSCP_PCGENB.

The oscillation signal generator 340 includes a frequency dividing/shifting unit 342 and a sequential oscillation signal generation unit 344. The frequency dividing/shifting unit 342 generates first and second source oscillation signals OSC_ODD and OSC_EVEN in response to the reference oscillation signal OSCP_PRE. The sequential oscillation signal generation unit 344 sequentially generates the oscillation signals OSC1 to OSC6 in response to the first and second source oscillation signals OSC_ODD and OSC_EVEN. Herein, the frequency dividing/shifting unit 342 generates the first source oscillation signal OSC_ODD by dividing the frequency of the reference oscillation signal OSCP_PRE, and generates the second source oscillation signal OSC_EVEN by shifting the first source oscillation signal OSC_ODD by a certain time. For example, the first and second source oscillation signals OSC_ODD and OSC_EVEN have a phase difference of approximately 90 degrees. The sequential oscillation signal generation unit 344 generates the oscillation signals OSC1 to OSC6 which are enabled sequentially in response to the first and second source oscillation signals OSC_ODD and OSC_EVEN.

The pre-charge signal generator 350 is realized by modeling the frequency dividing/shifting unit 342. In other words, the pre-charge signal generator 350 generates first and second pre-charge oscillation signals N1 and N2 which correspond to the first and second source oscillation signals OSC_ODD and OSC_EVEN and then generates the pre-charge signal OSCP_PCGENB by logically combining the first and second pre-charge oscillation signals N1 and N2. Herein, when both of the first and second pre-charge oscillation signals N1 and N2 have predetermined voltage levels, the pre-charge signal OSCP_PCGENB is enabled. For example, the pre-charge signal generator 350 outputs a pre-charge signal OSCP_PCGENB of a logic low level when both of the first and second pre-charge oscillation signals N1 and N2 have a logic high level. The pre-charge signal generator 350 includes a voltage level conversion unit 351, a first storage unit 352, a feedback unit 353, a second storage unit 354, a pre-charge signal output unit 355, and a voltage level setting unit 356. The voltage level converter 351 converts the voltage level of the reference oscillation signal OSCP_PRE. The first storage unit 352 stores the first pre-charge oscillation signal N1 in response to an output signal of the voltage level conversion unit 351. The feedback unit 353 feeds back the second pre-charge oscillation signal N2 stored in the second storage unit 354. The second storage unit 354 stores the second pre-charge oscillation signal N2, corresponding to an output signal of the first storage unit 352, in response to the output signal of the voltage level conversion unit 351. The pre-charge signal output unit 355 outputs the pre-charge signal OSCP_PCGENB in response to the first and second pre-charge oscillation signals N1 and N2. For example, the pre-charge signal output unit 355 may be a NAND gate that logically combines the first and second pre-charge oscillation signals N1 and N2 and outputs the result of the logical combination as the pre-charge signal OSCP_PCGENB. The voltage level setting unit 356 sets the voltage level of the first pre-charge oscillation signal N1 in response to a power up signal PWRUP provided during the initial operation. Herein, the feedback unit 353 is realized as an inverter for inverting the second pre-charge oscillation signal N2.

Figure 10:
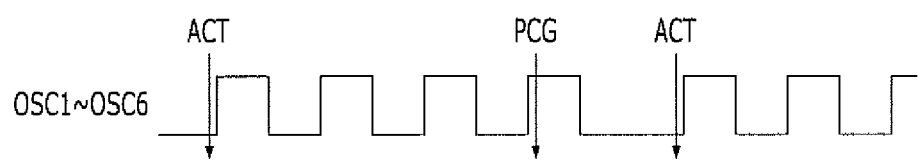
FIG. 10 is a timing diagram of a plurality of oscillation signals outputted from the oscillation signal generator of FIG. 9.

Hereafter, the operation of the pumping voltage generation circuit 300 having the above-described structure is described with reference to FIG. 10. FIG. 10 is a timing diagram of a plurality of oscillation signals outputted from the oscillation signal generator 340 of FIG. 9.

Herein, the operation of the pumping voltage generation circuit 300 having the above structure is described with reference to a scenario in which the pumping voltage generation circuit 300 enters an active mode ACT, subsequently switches to a pre-charge mode PCG, and then switches back to the active mode ACT. Particularly, FIG. 10 illustrates a case in which the oscillation signals OSC1 to OSC6 have a logic high level when the mode is switched to the pre-charge mode PCG.

Referring to FIG. 10, in the initial operation period a ground voltage VSS is applied based on the power up signal PWRUP. To be specific, during the initial operation period, the logic levels of the reference oscillation signal OSCP_PRE, the first and second source oscillation signals OSC_ODD and OSC_EVEN, and the pre-charge signal OSCP_PCGENB are set to a logic low level, and the signals maintain the logic low levels.

In this state, the voltage level detector 320 detects whether the pumping voltage VPP is lower than the reference voltage VREF. When it is detected that the pumping voltage VPP is lower than the reference voltage VREF, the voltage level detector 320 enables the detection signal VPPOSCEN. For example, the detection signal VPPOSCEN transitions from a logic low level to a logic high level. This signifies that the pumping voltage generation circuit 300 enters the active mode ACT.

The reference oscillation signal generator 330 toggles the reference oscillation signal OSCP_PRE in response to the enabled detection signal VPPOSCEN, regardless of the pre-charge signal OSCP_PCGENB. In short, the reference oscillation signal OSCP_PRE is outputted in the form of a pulse that toggles at a certain frequency.

Accordingly, the oscillation signal generator 340 sequentially toggles the oscillation signals OSC1 to OSC6 in response to the reference oscillation signal OSCP_PRE. To be more specific, the frequency dividing/shifting unit 342 divides the frequency of the enabled reference oscillation signal OSCP_PRE to toggle the first source oscillation signal OSC_ODD, and shifts the first source oscillation signal OSC_ODD by a certain time to toggle the second source oscillation signal OSC_EVEN. Subsequently, the sequential oscillation signal generation unit 344 sequentially toggles the odd-number oscillation signals OSC1, OSC3 and OSC5 among the oscillation signals OSC1 to OSC6 in response to the first source oscillation signal OSC_ODD, and sequentially toggles the even-number oscillation signals OSC2, OSC4 and OSC6 among the oscillation signals OSC1 to OSC6 in response to the second source oscillation signal OSC_EVEN.

Subsequently, the pumping voltage generator 310 generates the pumping voltage VPP by performing a charge pumping operation based on the oscillation signals OSC1 to OSC6 that are sequentially toggled.

Meanwhile, the voltage level detector 320 consistently detects whether the voltage level of the pumping voltage VPP is higher than the reference voltage VREF as the voltage level of the pumping voltage VPP increases. When it detects that the voltage level of the pumping voltage VPP is higher than the reference voltage VREF, the voltage level detector 320 disables the detection signal VPPOSCEN. For example, the detection signal VPPOSCEN transitions from a logic high level to a logic low level when the voltage level of the pumping voltage VPP is higher than the reference voltage VREF. This signifies that the pumping voltage generation circuit 300 enters the pre-charge mode PCG.

Herein, although the oscillation signals OSC1 to OSC6 are at a logic high level, a pre-charge signal OSCP_PCGENB is activated when the oscillation signals OSC1 to OSC6 are at a logic low level. Therefore, the oscillation signals OSC1 to OSC6 are pre-charged when they are at a logic low level. To be more specific, the pre-charge signal generator 350 enables a pre-charge signal OSCP_PCGENB of a logic low level when both of the first and second pre-charge oscillation signals N1 and N2 have a logic high level, that is, when both of the first and second source oscillation signals OSC_ODD and OSC_EVEN have a logic low level. Then, the reference oscillation signal generator 330 generates the reference oscillation signal OSCP_PRE corresponding to the enabled pre-charge signal OSCP_PCGENB, and the oscillation signal generator 340 receives the generated reference oscillation signal OSCP_PRE, fixes the logic levels of the oscillation signals OSC1 to OSC6, and outputs them when the oscillation signals OSC1 to OSC6 are at a logic low level. Since both of the first and second pre-charge oscillation signals N1 and N2 have a logic high level, the pre-charge signal OSCP_PCGENB is enabled in the pre-charge mode PCG. Therefore, it may be seen that the oscillation signals OSC1 to OSC6 are pre-charged when the oscillation signals OSC1 to OSC6 are at a logic low level.

Subsequently, when the mode is switched back to the active mode ACT, as described earlier, a series of operations corresponding to the active mode ACT are performed to sequentially toggle the oscillation signals OSC1 to OSC6.

According to the exemplary embodiment of the present invention described above, although the reference oscillation signal generator 330 and the oscillation signal generator 340 may be separated by a significant distance, the pumping voltage generation circuit 300 may be prevented from malfunctioning by utilizing the pre-charge signal OSCP_PCGENB.

According to an exemplary embodiment of the present invention, a semiconductor integrated circuit may pre-charge a plurality of oscillation signals to a certain voltage level in a pre-charge mode regardless of circuit arrangement by disposing a pre-charge signal generator, which models a portion of an oscillation signal generator, close to a reference oscillation signal generator. Further, such a semiconductor integrated circuit may also sequentially enable the oscillation signals in the next active mode without a delay. Therefore, the semiconductor integrated circuit according to the embodiment of the present invention may have improved operation reliability.

While the present invention has been described with respect to the specific embodiments, it will be apparent to those skilled in the art that various changes and modifications may be made without departing from the spirit and scope of the invention as defined in the following claims.

For example, the embodiments above refer to a pumping voltage generation circuit to describe the present invention by way of example, but the scope of the present invention is not limited to a pumping voltage generation circuit. Rather, the technology of the present invention may be applied to other technological areas which require feedback control in a sequential system and have increasing line loads due to restriction in position.

What is claimed is:

1. A semiconductor integrated circuit, comprising:
    a pre-charge signal generator configured to pre-charge a plurality of oscillation signals to a certain voltage level in a pre-charge mode,
    wherein the pre-charge signal generator comprises:
        a first storage unit configured to store a first pre-charge oscillation signal in response to a reference oscillation signal;
        a feedback unit configured to feed back a second pre-charge oscillation signal;
        a second storage unit configured to store the second pre-charge oscillation signal corresponding to an output signal of the first storage unit in response to the reference oscillation signal;
        a pre-charge signal output unit configured to output a pre-charge signal in response to the first pre-charge oscillation signal and the second pre-charge oscillation signal; and
        a voltage level setting unit for setting a voltage level of the first pre-charge oscillation signal in response to a power up signal provided during an initial operation period.

2. The semiconductor integrated circuit of claim 1, wherein the feedback unit comprises an inverter for inverting the second pre-charge oscillation signal.

3. The semiconductor integrated circuit of claim 1, further comprising:
    a voltage level converter configured to convert a voltage level of the reference oscillation signal.

4. The semiconductor integrated circuit of claim 1, further comprising:
    a reference oscillation signal generator configured to generate the reference oscillation signal in response to the pre-charge signal and an active signal; and an oscillation signal generator configured to sequentially generate the oscillation signals in response to the reference oscillation signal.

5. The semiconductor integrated circuit of claim 4, wherein the pre-charge signal generator is disposed closer to the reference oscillation signal generator than the oscillation signal generator.

6. The semiconductor integrated circuit of claim 4, wherein the active signal is enabled when a voltage level of a pumping voltage is higher than a voltage level of a reference voltage.

7. The semiconductor integrated circuit of claim 1, wherein the pre-charge signal output unit comprises a NAND gate configured to logically combine the first and second pre-charge oscillation signals.

8. A semiconductor integrated circuit, comprising:
   a reference oscillation signal generator configured to generate a reference oscillation signal in response to a pre-charge signal and an active signal;
   an oscillation signal generator configured to sequentially generate a plurality of oscillation signals in response to the reference oscillation signal; and
   a pre-charge signal generator configured to generate the pre-charge signal in response to the reference oscillation signal,
   wherein the pre-charge signal generator is disposed closer to the reference oscillation signal generator than the oscillation signal generator.

9. The semiconductor integrated circuit of claim 8, wherein the pre-charge signal is a signal for pre-charging the oscillation signals to a certain voltage level in a pre-charge mode, and
   the active signal is a signal triggering the oscillation signal generator to toggle the oscillation signals in an active mode.

10. The semiconductor integrated circuit of claim 8, wherein the oscillation signal generator comprises:
    a source oscillation signal generation unit configured to generate a plurality of source oscillation signals from the reference oscillation signal, the plurality of source oscillation signals having a certain phase difference therebetween; and
    a sequential oscillation signal generation unit configured to sequentially generate the oscillation signals in response to the source oscillation signals.

11. The semiconductor integrated circuit of claim 10, wherein the pre-charge signal generator comprises a circuit modeling the source oscillation signal generation unit.

12. The semiconductor integrated circuit of claim 11, wherein the source oscillation signal generation unit comprises a frequency divider.

13. The semiconductor integrated circuit of claim 11, wherein the pre-charge signal generator enables a pre-charge signal when the source oscillation signals have voltage levels corresponding to a pre-charge voltage level in the pre-charge mode.

14. The semiconductor integrated circuit of claim 8, wherein the reference oscillation signal generator generates an initialization signal for initializing the oscillation signal generator in response to the active signal and the pre-charge signal.

15. The semiconductor integrated circuit of claim 8, wherein the active signal corresponds to a pumping voltage detection result.

16. A semiconductor integrated circuit, comprising:
    a pumping voltage generator configured to generate a pumping voltage;
    a voltage level detector configured to detect the pumping voltage based on a reference voltage and to output a detection signal according to the detection result;
    a reference oscillation signal generator configured to generate a reference oscillation signal in response to a pre-charge signal and the detection signal;
    an oscillation signal generator configured to sequentially generate a plurality of oscillation signals for controlling the pumping voltage generator in response to the reference oscillation signal; and
    a pre-charge signal generator configured to generate the pre-charge signal in response to the reference oscillation signal,
    wherein the pre-charge signal generator is disposed closer to the reference oscillation signal generator than the oscillation signal generator.

17. The semiconductor integrated circuit of claim 16, wherein the oscillation signal generator is disposed closer to the pumping voltage generator than the reference oscillation signal generator.

18. The semiconductor integrated circuit of claim 16, wherein the pre-charge signal is a signal for pre-charging the oscillation signals to a certain voltage level in a pre-charge mode, and
    the detection signal is a signal triggering the oscillation signal generator to toggle the oscillation signals in an active mode.

19. The semiconductor integrated circuit of claim 16, wherein the oscillation signal generator comprises:
    a source oscillation signal generation unit configured to generate first and second source oscillation signals based on the reference oscillation signal, the first and second source oscillation signals having a certain phase difference therebetween; and
    a sequential oscillation signal generation unit configured to sequentially generate the oscillation signals in response to the first and second source oscillation signals.

20. The semiconductor integrated circuit of claim 19, wherein the pre-charge signal generator comprises a circuit modeling the source oscillation signal generation unit.

21. The semiconductor integrated circuit of claim 20, wherein the source oscillation signal generation unit comprises a frequency divider.

22. The semiconductor integrated circuit of claim 20, wherein the first and second source oscillation signals have a phase difference of approximately 90 degrees.

23. The semiconductor integrated circuit of claim 20, wherein the pre-charge signal generator enables a pre-charge signal when the first and second source oscillation signals have voltage levels corresponding to a pre-charge voltage level in the pre-charge mode.

24. The semiconductor integrated circuit of claim 16, wherein the reference oscillation signal generator generates an initialization signal for initializing the oscillation signal generator in response to the detection signal and the pre-charge signal.

* * * * *